UNITED STATES PATENT OFFICE.

EDWARD HACKING, OF CENTRAL FALLS, RHODE ISLAND.

ELECTRIC STORAGE BATTERY.

1,362,294.  Specification of Letters Patent. Patented Dec. 14, 1920.

No Drawing.  Application filed December 17, 1919. Serial No. 345,461.

*To all whom it may concern:*

Be it known that I, EDWARD HACKING, a citizen of the United States, residing at Central Falls, in the county of Providence and State of Rhode Island, have invented certain new and useful Improvements in Electric Storage Batteries, of which the following is a specification.

My invention relates particularly to an electrolyte for secondary or storage batteries of the standard type in which lead plates and sulfuric acid are employed.

The essential objects of my invention are to prevent the shedding of the active material of the plates; to make the use of separators unnecessary; to facilitate the circulation of the acid; to insure solidity and to maintain the plates firmly and rigidly; to eliminate washing from the plates the valuable oxid deposits thereon; to insure close adhesion of the electrolyte to the plates; and to provide an electrolyte capable of being introduced into the cell as a liquid and thereupon assume a solid condition without physical assistance.

My invention consists in such compositions, and in such steps and combinations of steps as form the subject matter of the appended claim.

The preferred method of carrying out my invention is as follows.

I prepare a solution formed by mixing water and silicate of soda in the proportion of four ounces of water to two ounces of silicate of soda.

I prepare independently of the above a second solution. This consists in dissolving borax in sulfuric acid of preferably approximately 1400 degrees Baumé. The proportion of ingredients is thirty two ounces of water to three ounces of borax.

Next a mixture of the following ingredients is made, namely, sixteen ounces of powdered pumice, four ounces of the first solution, and two ounces of the second solution.

This constitutes a thick creamy mixture which, in the required quantity is poured into the battery cell until it covers the plates. The quantity is obviously determined by the capacity of the particular cell. After about an hour after its introduction into the cell the material sets into a solid porous mass or electrolyte. The consistency of this material is such as to make separators unnecessary, and prevents shedding of the plates.

I claim:—

The process of forming a separator for electric storage batteries which consists in forming a solution of water and silicate of soda, also a solution of borax and sulfuric acid, next mixing a portion of both solutions with powdered pumice to the consistency of cream, and finally permitting the mixture to solidify.

In testimony whereof I have affixed my signature.

EDWARD HACKING.